US012738768B2

(12) United States Patent
Fujii

(10) Patent No.: US 12,738,768 B2
(45) Date of Patent: Sep. 15, 2026

(54) POWER SUPPLY SYSTEM AND POWER SUPPLY METHOD

(71) Applicant: MINEBEA MITSUMI Inc., Nagano (JP)

(72) Inventor: Masaaki Fujii, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 19/122,000

(22) PCT Filed: Nov. 2, 2023

(86) PCT No.: PCT/JP2023/039630
§ 371 (c)(1),
(2) Date: Apr. 17, 2025

(87) PCT Pub. No.: WO2024/101273
PCT Pub. Date: May 16, 2024

(65) Prior Publication Data

US 2026/0149312 A1 May 28, 2026

(30) Foreign Application Priority Data

Nov. 11, 2022 (JP) ................................ 2022-180987

(51) Int. Cl.
*H02J 50/20* (2016.01)
*H02J 50/40* (2016.01)

(52) U.S. Cl.
CPC ............ *H02J 50/20* (2016.02); *H02J 50/402* (2020.01)

(58) Field of Classification Search
CPC ................................ H02J 50/20; H02J 50/402
See application file for complete search history.

(56) References Cited

U.S. PATENT DOCUMENTS 11,789,118 B2 * 10/2023 Rosu ..................... G01S 7/4021 342/174
11,879,926 B2 * 1/2024 Gao ..................... H04B 17/102
(Continued)

FOREIGN PATENT DOCUMENTS

JP 2019-083648 5/2019

OTHER PUBLICATIONS

International Search Report of PCT/JP2023/039630 mailed on Jan. 16, 2024.
(Continued)

*Primary Examiner* — Menatoallah Youssef
*Assistant Examiner* — Michael J Warmflash
(74) *Attorney, Agent, or Firm* — IPUSA, PLLC

(57) ABSTRACT

A power supply system configured to quickly set a phase capable of increasing power received by a power receiving device, a power supply system, and a power supply method are provided. The power supply system includes a power supply device, and a first power receiving device configured to receive a power transmission signal transmitted from the power supply device. The power supply device includes an array antenna including a plurality of antennas configured to transmit power, and a power transmission controller configured to control a phase of the power transmission signal transmitted from the plurality of antennas to the first power receiving device and to perform power transmission control. The plurality of antennas are divided into a plurality of groups. Each group includes a plurality of antennas, each antenna being from among the plurality of antennas.

7 Claims, 20 Drawing Sheets

(56) References Cited

U.S. PATENT DOCUMENTS

| | | | | |
|---|---|---|---|---|
| 2020/0235611 | A1* | 7/2020 | Zeine | H02J 50/402 |
| 2020/0389285 | A1* | 12/2020 | Nuimura | H01Q 3/267 |
| 2026/0045830 | A1* | 2/2026 | Fujii | H02J 50/20 |

OTHER PUBLICATIONS

Written Opinion of the International Searching Authority for PCT/JP2023/039630 mailed on Jan. 16, 2024.

* cited by examiner

50A
RECEIVED POWER PHASE
59A
59
COMMUNICATOR
58
RECEIVED-POWER PHASE ESTIMATOR
57
SUBSET SELECTOR
56
CHANNEL ESTIMATOR
55
QUADRATURE DETECTOR
54
BATTERY
53
RF/DC CONVERTER
52
CONTROLLER
SW
51
POWER TRANSMISSION SIGNAL

FIG.4

| | TIME SLOT | | | | | | | | | | | | | | | |
|---|---|---|---|---|---|---|---|---|---|---|---|---|---|---|---|---|
| GROUP INDEX | 1 | 2 | 3 | 4 | 5 | 6 | 7 | 8 | 9 | 10 | 11 | 12 | 13 | 14 | 15 | 16 |
| 1 | 1 | 1 | 1 | 1 | 1 | 1 | 1 | 1 | 1 | 1 | 1 | 1 | 1 | 1 | 1 | 1 |
| 2 | 1 | −1 | 1 | −1 | 1 | −1 | 1 | −1 | 1 | −1 | 1 | −1 | 1 | −1 | 1 | −1 |
| 3 | 1 | 1 | −1 | −1 | 1 | 1 | −1 | −1 | 1 | 1 | −1 | −1 | 1 | 1 | −1 | −1 |
| 4 | 1 | −1 | −1 | 1 | 1 | −1 | −1 | 1 | 1 | −1 | −1 | 1 | 1 | −1 | −1 | 1 |
| 5 | 1 | 1 | 1 | 1 | −1 | −1 | −1 | −1 | 1 | 1 | 1 | 1 | −1 | −1 | −1 | −1 |
| 6 | 1 | −1 | 1 | −1 | −1 | 1 | −1 | 1 | 1 | −1 | 1 | −1 | −1 | 1 | −1 | 1 |
| 7 | 1 | 1 | −1 | −1 | −1 | −1 | 1 | 1 | 1 | 1 | −1 | −1 | −1 | −1 | 1 | 1 |
| 8 | 1 | −1 | −1 | 1 | −1 | 1 | 1 | −1 | 1 | −1 | −1 | 1 | −1 | 1 | 1 | −1 |
| 9 | 1 | 1 | 1 | 1 | 1 | 1 | 1 | 1 | −1 | −1 | −1 | −1 | −1 | −1 | −1 | −1 |
| 10 | 1 | −1 | 1 | −1 | 1 | −1 | 1 | −1 | −1 | 1 | −1 | 1 | −1 | 1 | −1 | 1 |
| 11 | 1 | 1 | −1 | −1 | 1 | 1 | −1 | −1 | −1 | −1 | 1 | 1 | −1 | −1 | 1 | 1 |
| 12 | 1 | −1 | −1 | 1 | 1 | −1 | −1 | 1 | −1 | 1 | 1 | −1 | −1 | 1 | 1 | −1 |
| 13 | 1 | 1 | 1 | 1 | −1 | −1 | −1 | −1 | −1 | −1 | −1 | −1 | 1 | 1 | 1 | 1 |
| 14 | 1 | −1 | 1 | −1 | −1 | 1 | −1 | 1 | −1 | 1 | −1 | 1 | 1 | −1 | 1 | −1 |
| 15 | 1 | 1 | −1 | −1 | −1 | −1 | 1 | 1 | −1 | −1 | 1 | 1 | 1 | 1 | −1 | −1 |
| 16 | 1 | −1 | −1 | 1 | −1 | 1 | 1 | −1 | −1 | 1 | 1 | −1 | 1 | −1 | −1 | 1 |

FIG.5A

| | | | | | | | |
|---|---|---|---|---|---|---|---|
| 1 | 2 | 3 | 4 | 5 | 6 | 7 | 8 |
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

Y
X

| 1 | 2 | 3 | 4 | 1 | 2 | 3 | 4 |
|---|---|---|---|---|---|---|---|
| 5 | 6 | 7 | 8 | 5 | 6 | 7 | 8 |
| 9 | 10 | 11 | 12 | 9 | 10 | 11 | 12 |
| 13 | 14 | 15 | 16 | 13 | 14 | 15 | 16 |
| 1 | 2 | 3 | 4 | 1 | 2 | 3 | 4 |
| 5 | 6 | 7 | 8 | 5 | 6 | 7 | 8 |
| 9 | 10 | 11 | 12 | 9 | 10 | 11 | 12 |
| 13 | 14 | 15 | 16 | 13 | 14 | 15 | 16 |

| | | | | | | | |
|---|---|---|---|---|---|---|---|
| 14 | 4 | 16 | 7 | 3 | 13 | 8 | 16 |
| 10 | 11 | 2 | 15 | 1 | 12 | 6 | 14 |
| 7 | 5 | 12 | 6 | 10 | 5 | 2 | 1 |
| 15 | 9 | 3 | 13 | 8 | 4 | 7 | 9 |
| 1 | 14 | 4 | 16 | 11 | 15 | 12 | 16 |
| 11 | 8 | 10 | 5 | 9 | 6 | 3 | 8 |
| 9 | 2 | 7 | 1 | 13 | 2 | 4 | 5 |
| 6 | 13 | 15 | 3 | 12 | 11 | 10 | 14 |

FIG.5D

| GROUP INDEX | DISTANCE (m) | GROUP INDEX | DISTANCE (m) |
|---|---|---|---|
| 1 | 6.3 | 9 | 6.3 |
| 2 | 8.0 | 10 | 7.2 |
| 3 | 7.2 | 11 | 6.3 |
| 4 | 6.3 | 12 | 6.3 |
| 5 | 7.2 | 13 | 6.3 |
| 6 | 6.3 | 14 | 8.2 |
| 7 | 7.2 | 15 | 7.2 |
| 8 | 7.2 | 16 | 8.0 |

FIG.6A $$S = \begin{bmatrix} A & B \\ X & C \end{bmatrix}$$

FIG.6B $$\begin{bmatrix} A & B \\ Y & C \end{bmatrix}, \begin{bmatrix} Y & A \\ C & B \end{bmatrix}, \begin{bmatrix} C & Y \\ B & A \end{bmatrix}, \begin{bmatrix} B & C \\ A & Y \end{bmatrix}, \begin{bmatrix} C & B \\ Y & A \end{bmatrix}, \begin{bmatrix} Y & C \\ A & B \end{bmatrix}, \begin{bmatrix} A & Y \\ B & C \end{bmatrix}, \begin{bmatrix} B & A \\ C & Y \end{bmatrix}$$

FIG.8

| | | OPTIMIZATION PERIOD | | | | POWER SUPPLY PERIOD | | | |
|---|---|---|---|---|---|---|---|---|---|
| TIME SLOT | | 1 | 2 | ⋯ | $N_S$ | $N_S+1$ | $N_S+2$ | $N_S+3$ | ⋯ |
| GROUP | 1 | $\theta_1$ | $\theta_1$ | ⋯ | $\theta_1$ | $\varphi_1+\Delta_1$ | $\varphi_1+\Delta_2$ | $\varphi_1+\Delta_3$ | ⋯ |
| | 2 | $\theta_2$ | $\theta_2+\pi$ | ⋯ | $\theta_2+\pi$ | $\varphi_2+\Delta_1$ | $\varphi_2+\Delta_2$ | $\varphi_2+\Delta_3$ | ⋯ |
| | 3 | $\theta_3$ | $\theta_3$ | ⋯ | $\theta_3+\pi$ | $\varphi_3+\Delta_1$ | $\varphi_3+\Delta_2$ | $\varphi_3+\Delta_3$ | ⋯ |
| | 4 | $\theta_4$ | $\theta_4+\pi$ | ⋯ | $\theta_4$ | $\varphi_4+\Delta_1$ | $\varphi_4+\Delta_2$ | $\varphi_4+\Delta_3$ | ⋯ |
| | 5 | $\theta_5$ | ⋯ | ⋯ | ⋯ | $\theta'_5$ | ⋯ | ⋯ | ⋯ |
| | ⋮ | ⋮ | ⋮ | ⋮ | ⋮ | ⋮ | RANDOM | PHASES | ⋯ |
| | $N_G$ | $\theta_{N_G}$ | ⋯ | ⋯ | ⋯ | $\theta'_{N_G}$ | ⋯ | ⋯ | ⋯ |

POWER SUPPLY SYSTEM AND POWER SUPPLY METHOD

TECHNICAL FIELD

The present invention relates to a power supply system and a power supply method.

BACKGROUND ART

Conventionally, there is known a power supply apparatus including a first detector configured to detect a direction of a power receiving device, and a controller configured to control a radiation section that radiates supply power to perform a first radiation for radiating the supply power by using radio waves in the direction of the power receiving device detected by the first detector and a second radiation for radiating the supply power by using the radio waves while changing a radiation direction of the supply power by a predetermined range (see, for example, Patent Document 1).

RELATED ART DOCUMENTS

Patent Documents

Patent Document 1: Japanese Laid-Open Patent Application No. 2019-083648

SUMMARY OF THE INVENTION

Problems to be Solved by the Invention

Pertinently, in the case of supplying power to a plurality of power receiving devices, the conventional power supply apparatus is not capable of supplying power to both a specific power receiving device that requires a large amount of power supply and remaining power receiving devices other than the specific power receiving device.

A power supply system and a power supply method capable of supplying power to both a specific power receiving device that requires a large amount of power supply and remaining power receiving devices other than the specific power receiving device are provided.

Means for Solving the Problems

The power supply system of an embodiment of the present invention includes: a power supply device; and a first power receiving device configured to receive a power transmission signal transmitted from the power supply device, wherein the power supply device includes an array antenna including a plurality of antennas configured to transmit power, and a power transmission controller configured to control a phase of the power transmission signal transmitted from the plurality of antennas to the first power receiving device and to perform power transmission control; the plurality of antennas are divided into a plurality of groups; each group includes a plurality of the antennas, each antenna being from among the plurality of antennas; the antennas included in N ("N" is an integer of 2 or greater) groups among the plurality of groups are included in an antenna subset configured to transmit the power transmission signal to the first power receiving device; and the first power receiving device is configured to select the top N number of groups supplying the largest power by the power transmission signal to the first power receiving device, as the groups to be included in the antenna subset.

Advantageous Effects of the Invention

The power supply system and the power supply method capable of supplying power to both the specific power receiving device that requires a large amount of power supply and the remaining power receiving devices other than the specific power receiving device are provided.

BRIEF DESCRIPTION OF THE DRAWINGS

FIG. 4 is a diagram illustrating an example of a WF code table.

FIG. 5A is a table illustrating an example of index assignment to 64 antenna elements 111.

FIG. 5C is a table illustrating an example of the index assignment to the 64 antenna elements 111.

FIG. 5D is a table illustrating an example of an average distance between the antenna elements 111 for each group index.

FIG. 6A is a diagram illustrating group indices of four antenna elements 111 in a 2×2 arrangement.

FIG. 6B is a diagram illustrating group indices of the four antenna elements 111 in the 2×2 arrangement.

FIG. 8 is a diagram illustrating an example of optimization processing.

DETAILED DESCRIPTION OF THE INVENTION

Hereinafter, a power supply system of the present invention, and an embodiment to which the power supply system and a power supply method of the present invention are applied will be described.

<Embodiment>

<Power Supply System 300>

Figure 1:
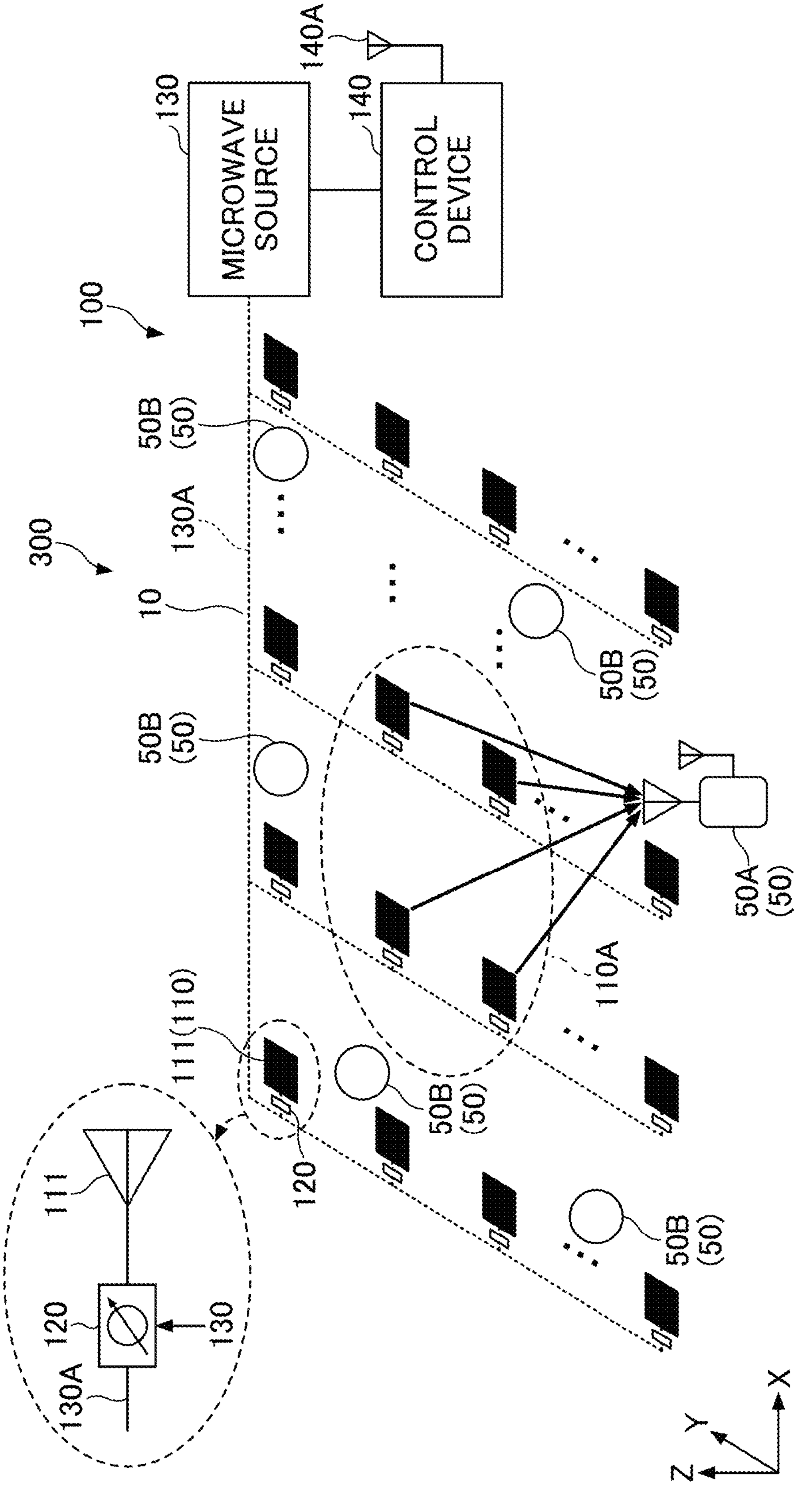
FIG. 1 is a diagram illustrating a power supply system 300 according to an embodiment.

FIG. 1 is a diagram illustrating a power supply system 300 of the embodiment. The power supply system 300 includes a power supply device 100 and a specific device 50A. The specific device 50A is an example of a power receiving device. The following description will be made by using an XYZ coordinate system. A plan view means a view in the XY plane. The power supply system 300 may include the power supply device 100 and a plurality of devices 50. The plurality of devices 50 encompasses both the specific device 50A and a plurality of non-specific devices 50B other than the specific device 50A.

As an example, the power supply device 100 is disposed in an area 10 of a large-scale facility such as a smart factory, a large-scale plant, a distribution center, or a warehouse. The power supply device 100 includes an array antenna 110, a phase shifter 120, a microwave source 130, and a control device 140, and supplies power (microwave power supply) to the plurality of devices 50 present in the area 10 in a non-contact manner. The power supply method of the embodiment is a power supply method achieved by the power supply device 100, and in particular, it is achieved by processing executed by the control device 140.

The power supply device 100 causes the array antenna 110 to transmit power by beamforming when supplying power to numerous unspecified devices 50. A plurality of antenna elements 111 of the array antenna 110 can transmit power at a power transmission phase specified by a power transmission controller to be described in the following. When the phases of the power transmission signals output from the plurality of antenna elements 111 are fixed, beams formed from a plurality of antenna output signals generate standing waves in the area 10, and power is not appreciably supplied to the devices 50 located at nodes of the standing waves. In order to avoid such a situation, the power supply device 100 randomly shifts the phases of a plurality of power transmission signals output from the plurality of antenna elements 111 in time series such that the nodes of the standing waves do not occur at a specific place for a long time. In other words, the nodes of the standing waves move within the area 10. The phase of the power transmission signal is shifted according to a time slot. The power transmission signal is a signal transmitted (power transmission) from the antenna element 111 and is a radio frequency (RF) signal having a predetermined power. As an example, the frequency of the power transmission signal is 918 MHz.

The power transmission, as described above, by a beam formed by randomly shifting the phase of the plurality of power transmission signals output from the plurality of antenna elements 111 according to the time slot is hereinafter referred to as random beamforming.

Furthermore, among the plurality of devices 50, there may be a device 50 which requires further power supply to charge an internal battery 54. For example, the device 50 that consumes more power than the other devices 50, in which a remaining amount of the internal battery 54 is reduced. The device 50 which requires further power supply is referred to as the specific device 50A. In FIG. 1, one device 50 at a certain time is illustrated as the specific device 50A. The specific device 50A is an example of the first power receiving device.

The specific device 50A receives power mainly from the plurality of antenna elements 111 included in an antenna subset 110A of the plurality of antenna elements 111. This is to charge the battery 54 of the specific device 50A quickly by performing power transmission more intensively than with the random beamforming.

The phase of power transmission from the plurality of antenna elements 111 included in the antenna subset 110A to the specific device 50A is set for each frame. In FIG. 1, the antenna subset 110A includes four antenna elements 111. Phase shifts of the power transmission signals to the antenna subset 110A and to the specific device 50A will be described in the following.

Among the plurality of devices 50, those devices other than the specific device 50A are called the non-specific devices 50B. Any of the devices 50 can be the specific device 50A depending on the situation. When the battery 54 reaches a sufficient amount of charge, the specific device 50A is no longer intensively supplied with power from the antenna subset 110A and becomes the non-specific device 50B. The non-specific device 50B is an example of a second power receiving device. The non-specific device 50B receives power transmitted from the antenna elements 111 included in the antenna subset 110A by the random beamforming.

The specific device 50A may be mounted on a remotely manageable mobile body such as an automatic guided vehicle (AGV) or an autonomous mobile robot (AMR) and be movable. All the devices 50 may be mounted on such a mobile body and be capable of becoming the specific device 50A depending on the situation, or only some of the devices 50 out of all the devices 50 may be mounted on such a mobile body and be capable of becoming the specific device 50A depending on the situation. Hereinafter, an example in which the specific device 50A is mounted on a mobile body and is movable will be described.

The power supply device 100 is a power supply device configured to transmit power both to the non-specific devices 50B by the random beamforming and to the specific device 50A from the antenna subset 110A. In the following, when the specific device 50A and the non-specific devices 50B are not specifically distinguished, they are simply referred to as the device 50.

In the following, a configuration in which the array antenna 110 includes 64 antenna elements 111 will be described as an example. The power supply system 300 divides the 64 antenna elements 111 into 16 groups in order to simplify selection processing to select the antenna elements 111 included in the antenna subset 110A from the 64 antenna elements 111. Each group includes four antenna elements 111. Each of the 16 groups is given a group index selected from group indices 1 to 16.

<Configuration of Specific Device 50A>

Figure 2A:
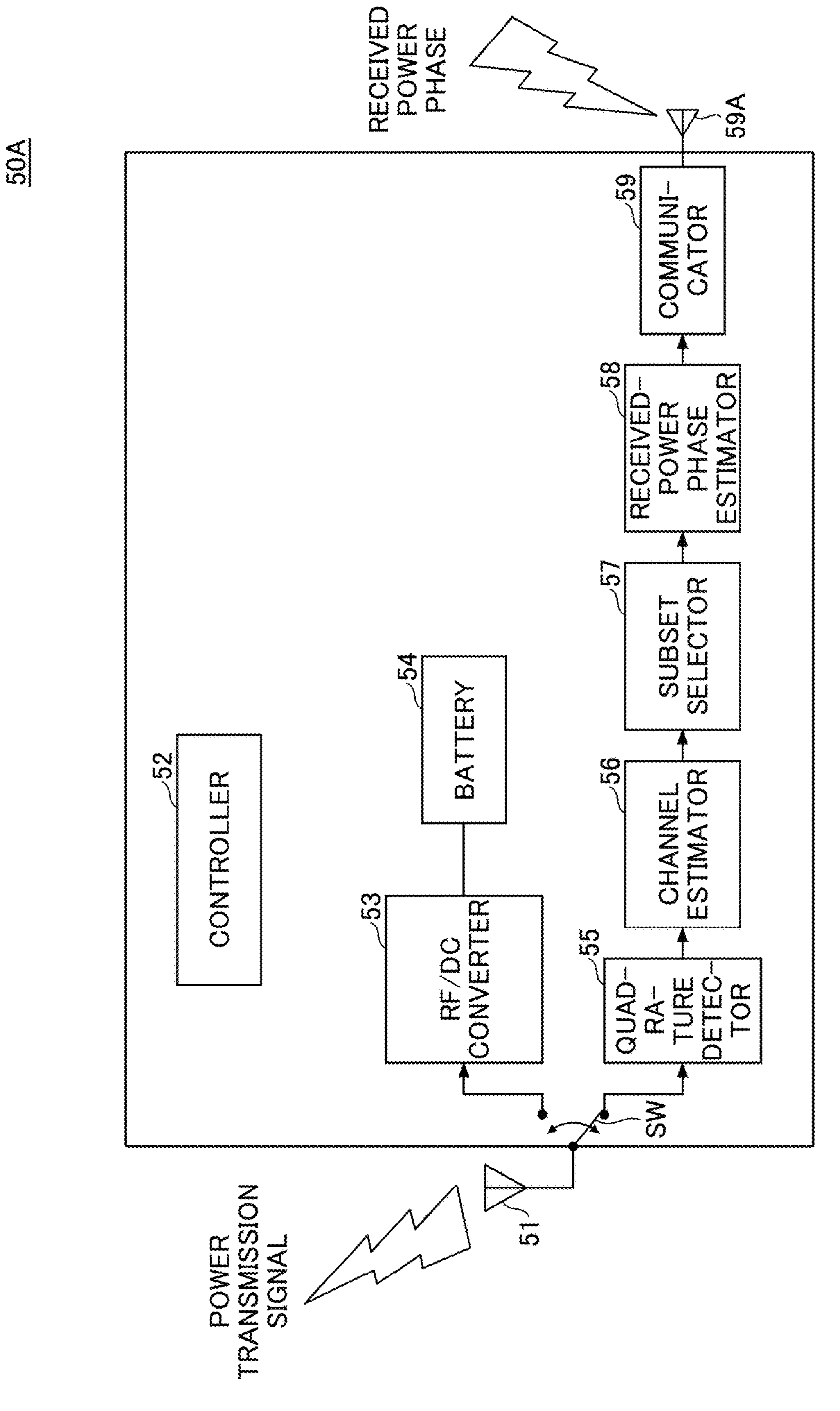
FIG. 2A is a diagram illustrating a configurational example of a specific device 50A.

FIG. 2A is a diagram illustrating a configurational example of the specific device 50A. The specific device 50A includes an antenna 51, a switch SW, a controller 52, an RF/direct current (DC) converter 53, the battery 54, a quadrature detector 55, a channel estimator 56, a subset selector 57, a received-power phase estimator 58, and a communicator 59. The communicator 59 includes an antenna 59A.

The antenna 51 is an antenna configured to receive power from one or more antenna elements 111. The antenna 51 outputs the received power to the switch SW. The switch SW is switched by the controller 52 to switch the connection destination of the antenna 51 to either the RF/DC converter 53 or the quadrature detector 55.

The controller 52 switches the switch SW between an optimization period and a power supply period in each frame. The controller 52 switches the switch SW to be connected to the quadrature detector 55 in the optimization period, and switches the switch SW to be connected to the RF/DC converter 53 in the power supply period.

In the optimization period, the controller 52 causes the quadrature detector 55, the channel estimator 56, the subset selector 57, the received-power phase estimator 58, and the communicator 59 to execute processing for transmitting data representing a received power phase obtained in the received-power phase estimator 58 to the control device 140 of the power supply device 100.

In the power supply period, the controller 52 performs charge control to charge the battery 54 with the received power received from the antenna elements 111 via the antenna 51.

The battery 54 is, for example, a secondary battery or capacitor, and charges the power supplied from the antenna 51. The power charged to the battery 54 is utilized when the switch SW, the controller 52, the RF/DC converter 53, the quadrature detector 55, the channel estimator 56, the subset selector 57, the received-power phase estimator 58, and the communicator 59 operate.

A load that consumes power may be connected to the battery 54. For example, the load may be a sensor that detects temperature, humidity, etc. In this case, the device 50 can be handled as a sensor device. The load may be a power source such as a motor or an actuator, and the device 50 may be a device that performs dynamic work.

When the device 50 is attached to a mobile body that is movable, the power charged by the battery 54 can be used as a power source such as a motor of the mobile body as the load and as power for driving the controller.

The RF/DC converter 53 is a converter (conversion circuit) that converts the power transmission signal (RF signal) received (reception) by the antenna 51 into DC power and outputs it to the battery 54.

The quadrature detector 55 demodulates the power transmission signal received by the antenna 51, extracts a reception sequence, and outputs it to the channel estimator 56. The reception sequence extracted by the quadrature detector 55 represents a combined amplitude and a phase of the power transmission signal received by the antenna 51. The reception sequence is an example of demodulation information.

The channel estimator 56 calculates a channel estimation value for each group based on the reception sequence input from the quadrature detector 55 and a WF code for each group. The channel estimation value includes dimensions corresponding to the voltage and the phase and is expressed as a complex number. The WF code is a Walsh-Hadamard code and is an example of a code table. The WF code will be described in the following with reference to FIG. 4.

The subset selector 57 calculates a squared value of an absolute value of the channel estimation value calculated for each group by the channel estimator 56 as the power received by each group. The subset selector 57 executes ranking processing with respect to the received power of all groups for each frame, and selects a predetermined number of groups from the top of the ranking as the groups to be included in the antenna subset 110A. The subset selector 57 outputs a selection result representing the groups selected as the groups to be included in the antenna subset 110A to the received-power phase estimator 58.

In the ranking processing, with respect to the received power of all groups, as an example, it is assumed that the groups whose received power is within −15 dB of the received power of the group whose received power is the highest are selected. As an example, the subset selector 57 selects a plurality of groups in the ranking whose received power is low by up to 15 dB relative to the group whose received power is the highest for each frame. Since the number of groups included in the antenna subset 110A in each frame is determined by the number of groups within a 15 dB drop from the highest value of the received power, it may differ from frame to frame.

Based on the selection result input from the subset selector 57, the received-power phase estimator 58 calculates a channel estimation value of the group included in the antenna subset 110A, and outputs a received power phase (angle information) represented by the calculated channel estimation value to the communicator 59 together with the selection result.

The communicator 59 transmits the selection result and the received power phase output from the received-power phase estimator 58, from the antenna 59A to the power supply device 100. The selection result output from the received-power phase estimator 58 to the communicator 59 is the selection result output from the subset selector 57 to the received-power phase estimator 58.

Although the configuration of the specific device 50A has been described with reference to FIG. 2A, among the plurality of devices 50, the device 50 which does not become the specific device 50A and functions only as the non-specific device 50B does not need to include the switch SW, the quadrature detector 55, the channel estimator 56, the subset selector 57, the received-power phase estimator 58, and the communicator 59, as long as the controller 52 can perform the charge control of the battery 54.

Figure 2B:
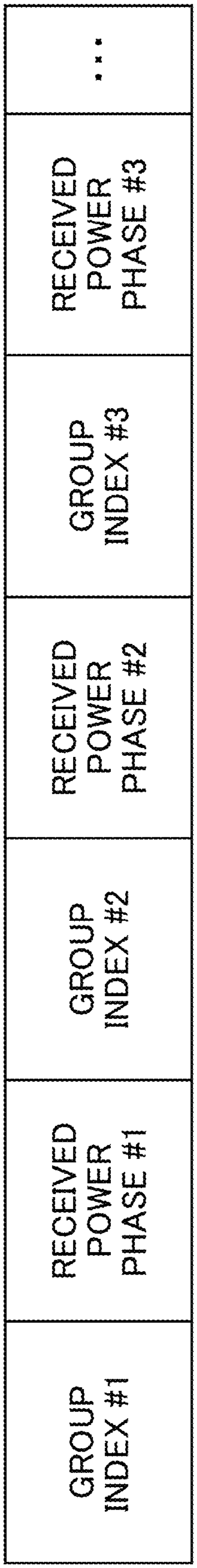
FIG. 2B is a diagram illustrating an example of a data structure of a packet transmitted from a communicator 59 to a power supply device 100.

Before describing the array antenna 110 as illustrated in FIG. 1, a data structure of the packet transmitted to the power supply device 100 by the communicator 59 will be described with reference to FIG. 2B. FIG. 2B is a diagram illustrating an example of the data structure of a packet transmitted to the power supply device 100 by the communicator 59.

In FIG. 2B, the packet includes group indices and received power phases selected from the first ranking in the descending order of the received power. In FIG. 2B, as an example, the group indices and the received power phases of the first to third ranking are indicated as a group index #1 and a received power phase #1, a group index #2 and a received power phase #2, and a group index #3 and a received power phase #3. When there are groups whose ranking is fourth or lower, their group indices and their received power phases follow after the third ranking group index #3 and the received power phase #3.

<Array Antenna 110>

As illustrated in FIG. 1, the array antenna 110 is an example of a two-dimensional antenna grid, and includes, as an example, antenna elements 111 arranged in a matrix. As an example, there are 64 antenna elements 111 consisting of eight in an X direction and eight in a Y direction. The 64 antenna elements 111 are positioned on the XY plane. As described above, the 64 antenna elements 111 are divided into 16 groups.

Each antenna element 111 is connected to the microwave source 130 via a power transmission cable 130A, and power in the microwave band is supplied. By being controlled by the control device 140, the antenna elements 111 included in the plurality of groups selected as the groups to be included in the antenna subset 110A among the 16 groups transmit power at an optimized phase toward the specific device 50A, and the power is also secondarily supplied to the non-specific devices 50B located in the vicinity of the specific device 50A.

The antenna elements 111 included in the group not included in the plurality of groups selected to be included in the antenna subset 110A transmit power to the non-specific devices 50B by random beamforming, but the antenna elements 111 located relatively near the specific device 50A also secondarily supply power to the non-specific devices 50B. The number of groups included in the antenna subset 110A may be any number as long as the number is greater than one.

Since each group includes four antenna elements 111, as an example, when four groups are selected as the groups to be included in the antenna subset 110A, there are four antenna subsets 110A including four antenna elements 111. However, by performing the processing described in the following, the antenna subset 110A that transmits power at an optimized phase toward the specific device 50A can be limited to one. That is, as illustrated in FIG. 1, there is one antenna subset 110A that transmits power at an optimized phase toward the specific device 50A.

The antenna element 111 is a rectangular patch antenna in a plan view. The antenna element 111 may include a ground plate held at a ground potential in a −Z direction.

Furthermore, according to the movement of the specific device 50A, the antenna elements 111 to be included in the antenna subset 110A are reviewed for each frame, and selection of the antenna elements 111 to be included in the antenna subset 110A is performed.

Each of the antenna elements 111 is attached to a ceiling, a pillar, or the like of a large-scale facility such as the above-described smart factory. As an example, the interval between the antenna elements 111 corresponds to several wavelengths in the communication frequency of the antenna elements 111. The communication frequency of the antenna elements 111 is assumed to be a microwave band as an example, and is 918 MHz as an example.

FIG. 1 is a drawing illustrating, as an example, a state in which the specific device 50A receives power from four antenna elements 111 out of 64 antenna elements 111 included in the array antenna 110. As described above, a set of a plurality of antenna elements 111 selected by the control device 140 to transmit power to the specific device 50A is called the antenna subset 110A. The antenna elements 111 not included in the antenna subset 110A transmit power by random beamforming while shifting the phase of the power transmission signal according to the time slot, and the power transmitted by the random beamforming is received by the non-specific devices 50B, and is also received by the specific device 50A as a secondary power.

One phase shifter 120 is connected to each antenna element 111, and is inserted between each antenna element 111 and the power transmission cable 130A. In FIG. 1, for convenience of explanation, one antenna element 111 and the phase shifter 120 are enlarged.

The phase shifter 120 shifts the power transmission phase of the power transmitted from the microwave source 130 through the power transmission cable 130A, and outputs it to the antenna element 111. The phase shifter 120 is an example of a phase adjuster.

The microwave source 130 is connected to 64 phase shifters 120 and supplies microwaves of a predetermined power. The microwave source 130 is an example of a radio wave source. The frequency of the microwave is 918 MHz as an example. In the following embodiment, although the power supply device 100 includes the microwave source 130, it is not limited to microwaves, and any radio waves of a predetermined frequency may be used.

The control device 140 is an example of the controller and is a microcomputer including a central processing unit (CPU), a read only memory (ROM), a random access memory (RAM), a non-volatile memory, etc. As an example, a discrete wavelet multitone (DWMT) can be used.

The control device 140 includes an antenna 140A and receives a beacon signal in which the received power phase and the selection result are written from the specific device 50A.

The control device 140 executes subset setting processing to set the antenna subset 110A based on the selection result received from the specific device 50A, phase control of the 64 phase shifters 120 based on the received power phase received from the specific device 50A, and output control of the power of the microwave source 130. The phase control of the power transmission signals of the antenna elements 111 included in the antenna subset 110A and the phase control of the power transmission signals by random beamforming of the antenna elements 111 not included in the antenna subset 110A are achieved by phase control of the phase shifter 120.

<Control Device 140>

Figure 3:
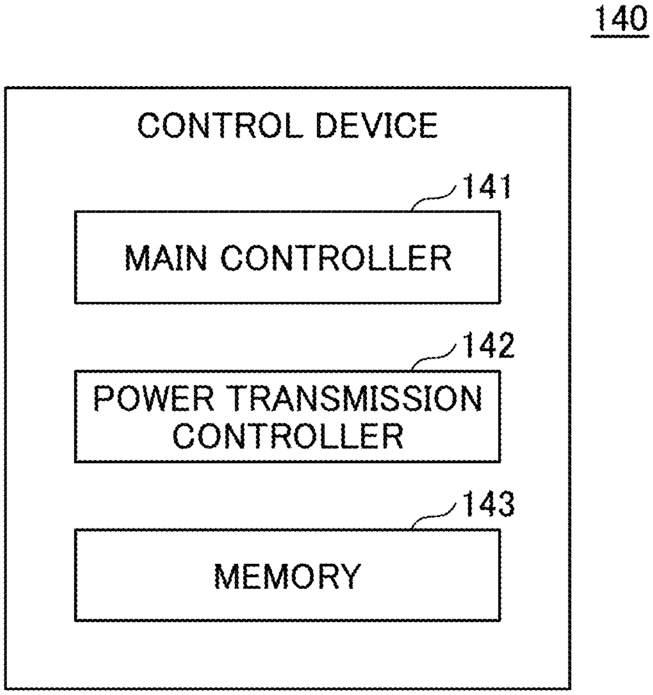
FIG. 3 is a diagram illustrating a configuration of a control device 140.

FIG. 3 is a diagram illustrating a configuration of the control device 140. The control device 140 includes a main controller 141, a power transmission controller 142, and a memory 143. The main controller 141 and the power transmission controller 142 represent functions of programs executed by the control device 140 as functional blocks. The memory 143 functionally represents the memory of the control device 140.

The main controller 141 is a processor that supervises processing of the control device 140 and executes processing other than those executed by the power transmission controller 142.

The power transmission controller 142 executes the subset setting processing to set the antenna elements 111 to be included in the antenna subset 110A based on the selection result received from the specific device 50A, the phase control to control the phases of the 64 phase shifters 120 based on the received power phase received from the specific device 50A, and the output control of the power of the microwave source 130.

When the antenna subset 110A is not set, the power transmission controller 142 performs power transmission control to transmit power from all of the antenna elements 111. When the power transmission is performed from all antenna elements 111, the power transmission controller 142 performs the power transmission control by random beamforming in which the phases of the power transmission signals of all antenna elements 111 are randomly set and the phases are randomly shifted for each time slot (random mode). Thus, the position where the standing wave of the power transmission signal occurs in the area 10 (see FIG. 1) can be prevented from being fixed in time, and all the devices 50 can receive power relatively equally.

When the antenna subset 110A is formed, the power transmission controller 142 executes optimization processing in the optimization period of each frame and power supply processing in the power supply period of each frame. The optimization processing in the optimization period and the power supply processing in the power supply period will be described in the following.

The memory 143 stores data, programs, and the like that are used when the main controller 141 and the power transmission controller 142 execute processing. Data representing the phase of the power transmission signal in each time slot is also stored in the memory 143.

<Walsh-Hadamard (WH) Code Table>

FIG. 4 is a diagram illustrating an example of a WF code table. In FIG. 4, code values generated for the time slots 1 to 16 with respect to group indices 1 to 16 are indicated. In FIG. 4, a code value 1 indicates that a phase shift amount is 0 degrees, and a code value −1 indicates that the phase shift amount is 180 degrees. That is, the code value 1 and the code value −1 differ in the phase shift amount by 180 degrees (π).

By using such a code table, while shifting the power transmission phases of the 16 groups of the antenna elements 111, the groups to be included in the antenna subset 110A are selected and the received power phase is estimated. The number of time slots is set to 16 as an example such that the phase shift amount of the 16 groups can be changed 16 times. The number of time slots may be less than or greater than 16, but it is preferable to be an integer multiple of the number of groups.

<Grouping>

Figure 5B:
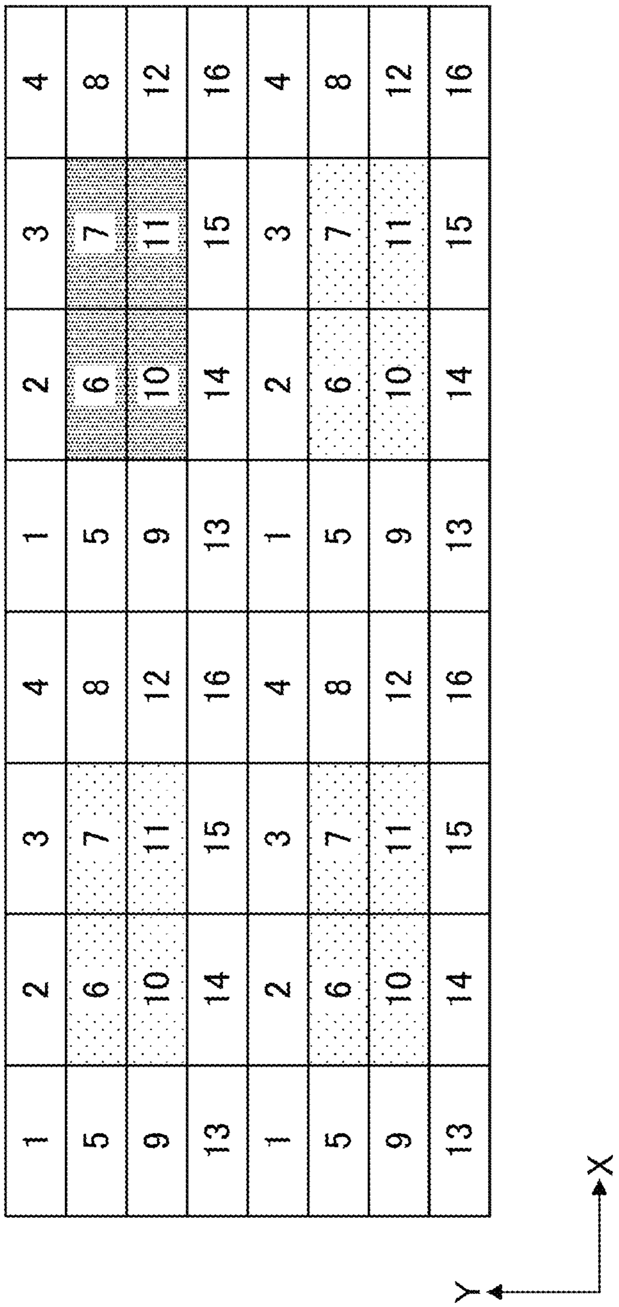
FIG. 5B is a table illustrating an example of the index assignment to the 64 antenna elements 111.

FIGS. 5A to 5C illustrate examples of assignment of indices to the 64 antenna elements 111. FIGS. 5A to 5C illustrate the examples of the indices assigned to the total of 64 antenna elements 111, formed by arranging 8 antenna elements 111 in the X direction and 8 antenna elements 111 in the Y direction.

In FIG. 5A, an example indicating a result of regularly assigning indices 1 to 64 to the 64 antenna elements 111 is illustrated. The indices 1 to 64 are sequentially assigned from the corner of a −X direction and a +Y direction to the corner of a +X direction and a −Y direction. Since the same number of indices as the number of antenna elements 111 is required, the number of code values is 64 and the code length is 64, and thus, an overhead increases. In addition, since a received signal sequence of 64 time slots needs to be processed on a receiver side, a calculation amount increases.

In FIGS. 5B and 5C, results of the group index assignment when the 64 antenna elements 111 are divided into 16 groups are illustrated. Since each group includes four antenna elements 111, there are four identical group indices in each of FIGS. 5B and 5C. The power transmission phases of the four antenna elements 111 having the same group index are set to the same power transmission phase.

FIG. 5B is a diagram illustrating the result of group index assignment when the 64 antenna elements 111 are divided into four areas (areas including a total of 16 antenna elements 111 formed in a 4×4 arrangement) with straight lines parallel to an X-axis and a Y-axis that pass through the center of the 64 antenna elements 111, and the group indices 1 to 16 are regularly arranged as the indices for each area.

As compared with the case of FIG. 5A, since the number of code values is reduced to 16, which is ¼ the number of code values in FIG. 5A, the overhead can be reduced to ¼. The minimum distance between the antenna elements 111 to which the same group indices are assigned is 8.0 m when a distance between adjacent antenna elements 111 is 2.0 m, such that the antenna elements 111 are not appreciably affected by each other.

However, for example, four antenna elements 111 with group indices 6, 7, 10, and 11 exist in each area in the 2×2 arrangement, and all four antenna elements 111 have the same arrangement. For example, when the antenna subset 110A that transmits power at the optimized phase to the specific device 50A includes the antenna elements 111 of the four groups with group indices 6, 7, 10, and 11, and the four antenna elements 111 are in the 2×2 arrangement, beams obtained by beamforming in the four antenna subsets 110A cannot be distinguished. In other words, the antenna subset 110A that transmits power at the optimized phase to the specific device 50A cannot be limited to one. Therefore, one antenna subset 110A out of the four antenna subsets 110A can transmit power at the optimized phase to the specific device 50A, but the remaining three antenna subsets 110A transmit beam-form power transmission signals to positions where the specific device 50A do not exist, and thus, undesirably generate unnecessary strong electric field areas.

Therefore, the power supply system 300 randomly assigns 16 group indices to the 64 antenna elements 111 as illustrated in FIG. 5C. In FIG. 5C, the antenna elements 111 to which the same group index is assigned maintain a certain distance or more. For example, it is assumed that the group indices of the groups selected to be included in the antenna subset 110A are 12, 6, 5, and 2, and the antenna subset 110A selected to transmit the power transmission signal to the specific device 50A includes four antenna elements 111 in the 2×2 arrangement with group indices 12, 6, 5, and 2, as indicated by applying a dark dotted pattern at a position in the +X and +Y directions.

In this case, since 16 group indices are randomly assigned to 64 antenna elements 111 in FIG. 5C, the remaining three antenna subsets 110A do not have the 2×2 arrangement of the four antenna elements 111 with group indices of 12, 6, 5, and 2, as indicated by applying a light dotted pattern.

The antenna subset 110A including 12, 6, 5, and 2 in the 2×2 arrangement indicated by applying the dark dotted pattern can transmit a beam-form power transmission signal with the optimized power transmission phase toward the specific device 50A. More specifically, the power transmission signal can be transmitted by random beamforming while maintaining the optimized power transmission phase. However, since the three antenna subsets 110A including 12, 6, 5, and 2 indicated by applying the light dotted pattern do not have the 2×2 arrangement, even when the three antenna subsets 110A include the group indices of 12, 6, 5, and 2, the phases of synthesized power transmission signals are not optimized, and thus, generation of unnecessary strong electric field areas can be suppressed.

In each of the remaining three antenna subsets 110A, power transmission signals are transmitted by random beamforming from the antenna elements 111 located around the four antenna elements 111, such that the multipath is randomized for each time slot, and thus the continuation of a strong electric field at a certain place can be further suppressed.

The reason why a distant distance between the antenna elements 111 to which the same group index is assigned is set is that, when the power transmission signals transmitted by the plurality of antenna elements 111 to which the same group index is assigned reach the antenna of the specific device 50A in opposite phases, the power transmission signals cancel each other, but by increasing the distance between the antenna elements 111, even when the power transmission signals are in the opposite phases, an amplitude difference becomes large, and mutual cancellation can be prevented.

FIG. 5D is a table illustrating an example of an average distance between the antenna elements 111 for each group index. In FIG. 5D, an average distance between two antenna elements 111 out of four antenna elements 111 in each group, when 16 group indices are randomly assigned to the 64 antenna elements 111 as illustrated in FIG. 5C, is illustrated. As illustrated in FIG. 5D, a distance of 6.3 m or more is obtained for all the groups 1 to 16, and it can be confirmed that a sufficient distance is maintained between the four antenna elements 111 in each group.

In order to randomly assign 16 group indices to the 64 antenna elements 111 as illustrated in FIG. 5C, it is necessary to maintain a sufficient distance between the four antenna elements 111 in each group while maintaining randomness.

When 16 group indices are randomly assigned to the 64 antenna elements 111, for example, as illustrated in FIG. 5B, the following processing can be executed to suppress generation of a plurality of antenna subsets 110A including the antenna elements 111 with group indices 6, 7, 10, and 11.

FIGS. 6A and 6B are diagrams illustrating the group indices of the four antenna elements 111 in the 2×2 arrangement. For example, suppose that the group indices of the four antenna elements 111 included in one 2×2 arrangement are X, A, B, and C. In such a case, when the group index X is replaced by a group index Y, 16 group indices may be randomly assigned to the 64 antenna elements 111 such that the eight 2×2 arrangement patterns as illustrated in FIG. 6B do not occur. FIG. 6B illustrates 8 patterns of the 2×2 arrangement in which the group indices Y, A, B, and C are included.

When at least one of the 2×2 arrangement in which the group indices are X, A, B, and C as illustrated in FIG. 6A or the eight 2×2 arrangement (group indices are Y, A, B, and C) as illustrated in FIG. 6B is included in the group indices of the 64 antenna elements 111, when the group index X and the group index Y are equal, a plurality of antenna subsets 110A that include the same four group indices will occur, and the antenna subset 110A that transmits power at the optimized phase toward the specific device 50A cannot be limited to one.

<Frame Structure>

Figure 7:
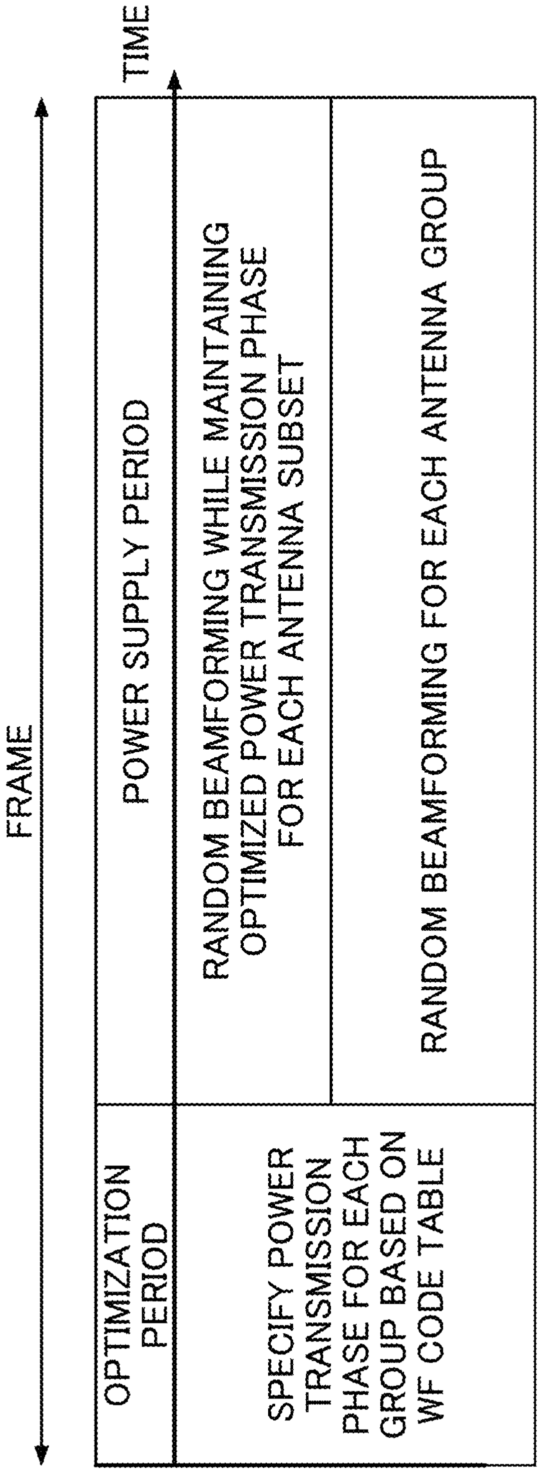
FIG. 7 is a diagram illustrating an example of a frame structure.

FIG. 7 is a diagram illustrating an example of a frame structure. A frame period is 50 ms as an example. The frame includes an optimization period and a power supply period. The power supply period is provided after the optimization period.

The optimization period is a period in which a power transmission phase is set for each of a plurality of groups based on the WF code table (FIG. 4) and optimization processing is executed to optimize the power transmission phases of the plurality of groups included in the antenna subset 110A that transmits power transmission signals to the specific device 50A.

To optimize the power transmission phases of the plurality of groups included in the antenna subset 110A that transmits power transmission signals to the specific device 50A means to make the phases (received power phases) the same when the power transmission signals transmitted by the antenna elements 111 of the plurality of groups selected by the specific device 50A as the groups to be included in the antenna subset 110A are received by the antenna 51 of the specific device 50A. This is because when the received power phases of the plurality of power transmission signals are made to be the same, the power received by the specific device 50A can be maximized. It should be noted that a state in which the phases are made to be the same is not limited to a case where the phases are exactly the same, but also includes a case where the phases are substantially the same. In some cases, it is not easy to make the phases the same in a strict sense and when the phase deviation is about ±5%, for example, it is safe to assume that the phases are made to be the same.

As described with reference to FIG. 5C, here, as an example, since each group includes four antenna elements 111, the power transmission phase is optimized in the four antenna subsets 110A. However, since there is only one antenna subset 110A among the four antenna subsets 110A, in which the antenna elements 111 of the group included in the antenna subset 110A are in the 2×2 arrangement, it is possible to determine which of the four antenna subsets 110A is the one to transmit power at the optimized phase toward the specific device 50A.

The power supply period is a period during which the power supply processing is executed to transmit power transmission signals from the antenna elements 111 of a plurality of groups in a state that the phases of the power transmission signals to be transmitted by the antenna elements 111 of the plurality of groups are optimized in the optimization processing executed in the optimization period. During the power supply period, random beamforming is performed with respect to the antenna elements 111 of the plurality of groups included in the antenna subset 110A while maintaining a relationship between the power transmission phases of the plurality of groups included in the antenna subset 110A determined in the optimization processing executed in the optimization period of the same frame. Also, with respect to the antenna elements 111 of the plurality of groups not included in the antenna subset 110A, random beamforming is performed without having any relationship between the power transmission phases of the groups of the antenna elements 111. Note that with respect to the antenna elements 111 of the plurality of groups not included in the antenna subset 110A, random beamforming may be performed without having any relationship between the power transmission phases of the plurality of antenna elements 111 regardless of the groups.

<Optimization of Power Transmission Phase>

The power transmission signals transmitted from the antenna elements 111 with a common (identical) power transmission phase between groups receive a phase shift corresponding to path differences and reach the antenna 51 of the specific device 50A.

The quadrature detector 55 demodulates the power transmission signals received by the antenna 51 and extracts a reception sequence r(l) (l=1, . . . , $N_S$). "l" is an index of a time slot, and the maximum value is $N_S$. Here, $N_S$ is 16 as an example.

The channel estimator 56 calculates a channel estimation value of each group based on the reception sequence input from the quadrature detector 55 and the WF codes (see FIG. 4) for each group. The WF code for each group is W=w(g, l), (g=1, . . . , $N_G$). "g" is the group index, and $N_G$ is the maximum value of the group index. Here, as an example, $N_G$ is 16.

The channel estimator 56 calculates a channel estimation value $h_g$ for the group with the group index "g" according to the following equation (1).

[Formula 1]

$$h_g = \frac{1}{N_S}\sum_{l=1}^{N_S} w(g, l)r(l) \tag{1}$$

The subset selector 57 calculates a squared value of the absolute value of the channel estimation value $h_g$ as received power $p_{R,g}$ received by the antenna 51 of the specific device 50A from the antenna element 111 of the group with the group index "g" according to the following equation (2).

[Formula 2]

$$p_{R,g} = |h_g|^2 \tag{2}$$

The subset selector 57 executes the ranking processing on the power received from all groups for each frame, and selects the predetermined number of groups from the top of the raking as the groups to be included in the antenna subset 110A. Specifically, as an example, groups from which the power of up to −15 dB of the power of the group from which the highest power is received are selected. The subset selector 57 outputs a selection result representing the groups selected as the groups to be included in the antenna subset 110A to the received-power phase estimator 58.

The received-power phase estimator 58 calculates channel estimation values $h_s$ of the plurality of groups to be included in the antenna subset 110A according to the following equation (3) based on the selection result input from the subset selector 57. Here, "s" is the corresponding group index of the plurality of groups to be included in the antenna subset 110A.

For example, as illustrated in FIG. 5C, when the antenna subset 110A includes four groups whose group index "g" is 12, 6, 5, and 2, the group index "s" of the plurality of groups to be included in the antenna subset 110A is 12, 6, 5, and 2.

The channel estimation value $h_s$ is a channel estimation value for the group with the group index "s". The channel estimation value $h_s$ is calculated for each group with the group index "s".

[Formula 3]

$$h_s = h_{s,I} + jh_{s,Q} \tag{3}$$

Based on the channel estimation value $h_s$ expressed by the equation (3), the received-power phase estimator 58 calculates a received power phase $\Delta\theta_s$ when the antenna 51 of the specific device 50A receives power from the antenna elements 111 of the group with the group index "s" according to the following equation (4).

[Formula 4]

$$\Delta\theta_s = \tan^{-1}\left\{\frac{h_{s,Q}}{h_{s,I}}\right\} \tag{4}$$

The received-power phase estimator 58 outputs the received power phase of each group with the group index "s" to the communicator 59 together with the selection result (group index "s"). The communicator 59 transmits the selection result and the received power phase of each group with the group index "s" to the power supply device 100.

The power transmission controller 142 sets an initial value of the power transmission phase of the antenna element 111 of the group with the group index "s" to be $\varphi_s$ from the selection result and the received power phase returned from the specific device 50A according to the following equation (5). In this way, the power transmission phase of the antenna element 111 of the group included in the antenna subset 110A is optimized. The power transmission phase $\varphi_s$ (initial value) is set for each group with the group index "s". When the group index "s" is 12, 6, 5, and 2, the power transmission phase $\varphi_s$ corresponding to the group index is set for each group with the group index "s" of 12, 6, 5, and 2.

[Formula 5]

$$\varphi_s = \theta_s - \Delta\theta_s \tag{5}$$

Thus, by optimizing the power transmission phase of the antenna elements 111 of the group included in the antenna subset 110A, the power transmission signal transmitted from the antenna elements 111 of the group with the group index "s" is made in-phase when the antenna 51 of the specific device 50A receives power, and the received power is maximized.

<Optimization Processing>

FIG. 8 is a diagram illustrating an example of optimization processing. In FIG. 8, an optimization period, a power supply period, and a time slot for one frame are illustrated. The optimization processing includes the $N_S$ number of time slots. Although not specifically illustrated in the diagram, the power supply period starts at time slot $N_S+1$ and is longer than the optimization period.

The group index "g" of the group of the antenna elements 111 included in the array antenna 110 is 1 to $N_G$. In time slot 1, the power transmission phases of the antenna elements 111 whose group index "g" is 1 to $N_G$ are set to $\theta_1$ to $\theta N_G$. In this state, transmission of the power transmission signal is started. The power transmission phases $\theta_1$ to $\theta N_G$ can be any power transmission phases.

From time slot 2, the power transmission phase of the antenna elements 111 of each group is set according to the WH code table. For example, in time slot 2, the power transmission phase of the antenna elements 111 of the group whose group index "g" is an even number is shifted by 180 degrees (+π) with respect to the power transmission phase in time slot 1. Thus, the power transmission phase of the antenna elements 111 of each group is shifted for each time slot according to the WH code table. In time slots 1 to $N_S$, the power transmission phase of the antenna elements 111 of the group index 1 is fixed at $\theta_1$.

Also, during the power supply period, it is assumed that the groups with the group indices 1 to 4 are selected as the four groups to be included in the antenna subset 110A. Also, the group index "g" of the groups not included in the antenna subset 110A is 5, . . . , $N_G$.

For the antenna elements 111 of the group with the group indices 1 to 4 included in the antenna subset 110A, the power transmission phases of the antenna elements 111 of the group with the group indices 1 to 4 are set to the optimized power transmission phases φ1 to φ4, and random beamforming is performed while maintaining the optimized power transmission phases φ1 to φ4. As an example, by shifting the power transmission phases of the antenna elements 111 of the group with the group indices 1 to 4 by Δ1, Δ2, Δ3, . . . for each time slot, random beamforming is performed while maintaining the optimized power transmission phases φ1 to φ4.

In addition, for the antenna elements 111 of the groups not included in the antenna subset 110A, random beamforming is performed without establishing a specific relationship among the power transmission phases of the groups including a plurality of antenna elements 111. The power supply period is an example of a power transmission period. For the antenna elements 111 of the plurality of groups not included in the antenna subset 110A, random beamforming may be performed without establishing a specific relationship among the power transmission phases of the plurality of antenna elements 111 regardless of the group.

<Phase of Power Transmission Signal Received by Specific Device 50A>

FIGS. 9A to 9D are diagrams illustrating phase optimization of the power transmission signals received by the specific device 50A. An I-axis is a real axis, and a Q-axis is an imaginary axis.

Figure 9A:
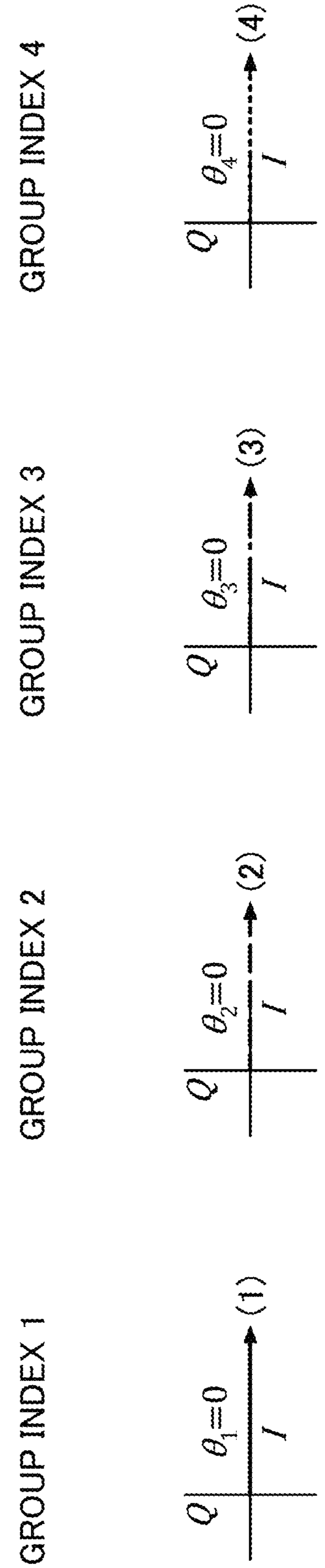
FIG. 9A is a diagram illustrating phase optimization of power transmission signals received by the specific device 50A.

FIG. 9A is a diagram illustrating the power transmission phases $\theta_1$ to $\theta_4$ of the power transmission signals transmitted from the antenna elements 111 of the group indices 1 to 4 in time slot 1 of the optimization period. Since the power transmission phases $\theta_1$ to $\theta_4$ can be any power transmission phases, the power transmission phases $\theta_1$ to $\theta_4$ are all set to 0 degrees for clarity. The four vectors (1) to (4) in FIG. 9A represent the power transmission signals transmitted from the antenna elements 111 of the group indices 1 to 4.

Figure 9B:
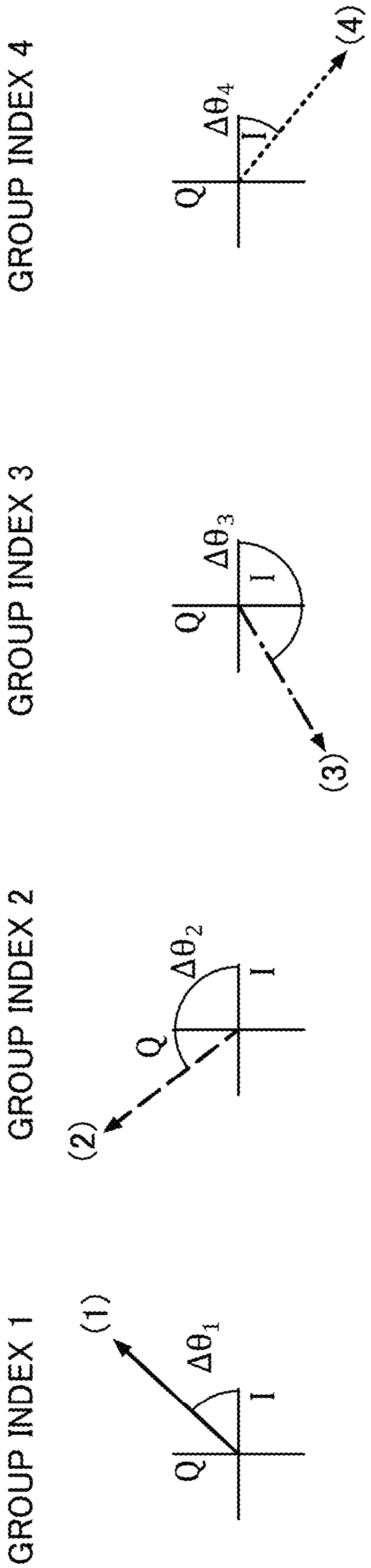
FIG. 9B is a diagram illustrating the phase optimization of the power transmission signals received by the specific device 50A.

FIG. 9B is a diagram illustrating the received power phases when the antenna 51 of the specific device 50A receives the power transmission signals of the power transmission phases $\theta_1$ to $\theta_4$ as illustrated in FIG. 9A. In the antenna 51, the power transmission signals transmitted from the antenna elements 111 of the group indices 1 to 4 are synthesized, however, they are separately illustrated in FIG. 9B. The four vectors (1) to (4) in FIG. 9B represent the power transmission signals transmitted from the antenna elements 111 of the group indices 1 to 4 and received by the antenna 51.

As illustrated in FIG. 9B, when the antenna 51 of the specific device 50A receives the power transmission signals transmitted from the antenna elements 111 of the group indices 1 to 4, the received power phases are $\Delta\theta_1$ to $\Delta\theta_4$.

In such a case, in order to optimize the power transmission signals transmitted from the antenna elements 111 of the group indices 1 to 4, the received power phases of the power transmission signals transmitted from the antenna elements 111 of the group indices 1 of 4 when they are received by the antenna 51 of the specific device 50A need to be made the same.

Figure 9C:
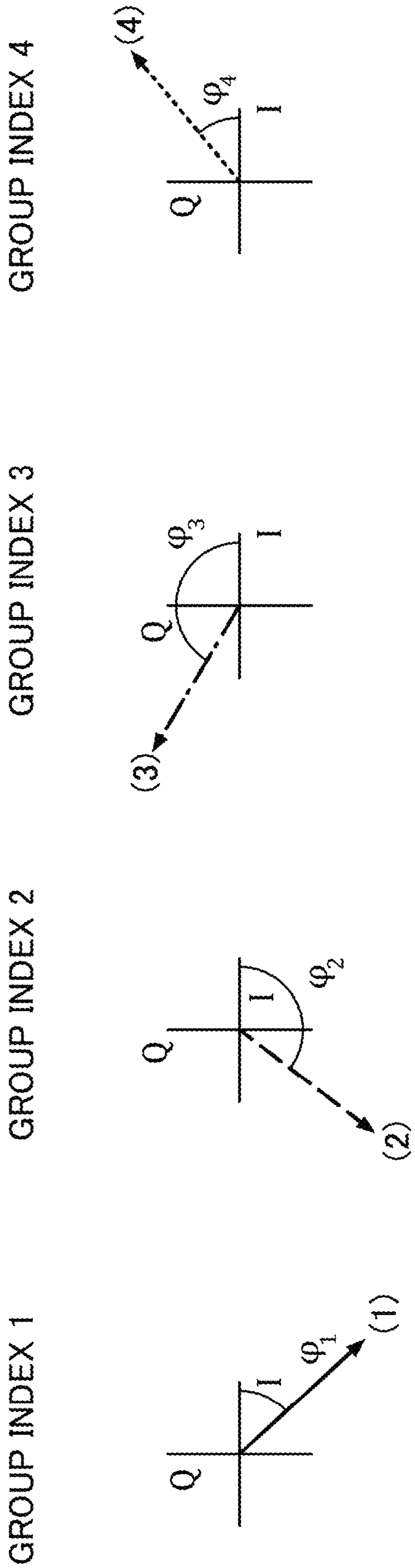
FIG. 9C is a diagram illustrating the phase optimization of the power transmission signals received by the specific device 50A.

Here, when the optimized values of the power transmission signals transmitted from the antenna elements 111 of the group indices 1 to 4 are φ1 to φ4 as illustrated in FIG. 9C, it is sufficient to set $\varphi_1=-\Delta\theta_1$, $\varphi_2=-\Delta\theta_2$, $\varphi_3=-\Delta\theta_3$, and $\varphi_4=-\Delta\theta_4$. The four vectors (1) to (4) in FIG. 9C represent the power transmission signals transmitted from the antenna elements 111 of the group indices 1 to 4.

Figure 9D:
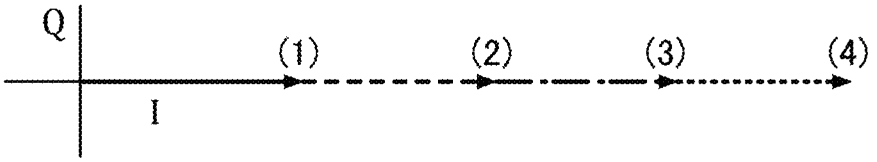
FIG. 9D is a diagram illustrating the phase optimization of the power transmission signals received by a specific device 50A.

When power supply is started in the power supply period by obtaining the optimized power transmission signals φ1 to φ4 in this way, the received power phases when the antenna 51 of the specific device 50A receives power are all 0 degrees, as illustrated in FIG. 9D. The four vectors (1) to (4) in FIG. 9D represent the power transmission signals transmitted from the antenna elements 111 of the group indices 1 to 4 and received by the antenna 51.

Since the power transmission phases $\theta_1$ to $\theta_4$ are all set to 0 degrees for clarity, the received power phases when the antenna 51 of the specific device 50A receives power are all 0 degrees, as illustrated in FIG. 9D. However, when the power transmission phases $\theta_1$ to $\theta_4$ are all 45 degrees, for example, the received power phases when the antenna 51 of the specific device 50A receives power are all 45 degrees.

In this way, the angles of the vectors (1) to (4) when the antenna 51 of the specific device 50A receives power can be made the same, as illustrated in FIG. 9D. In other words, the receiving power of the specific device 50A can be maximized.

<Flowchart>

Figure 10:
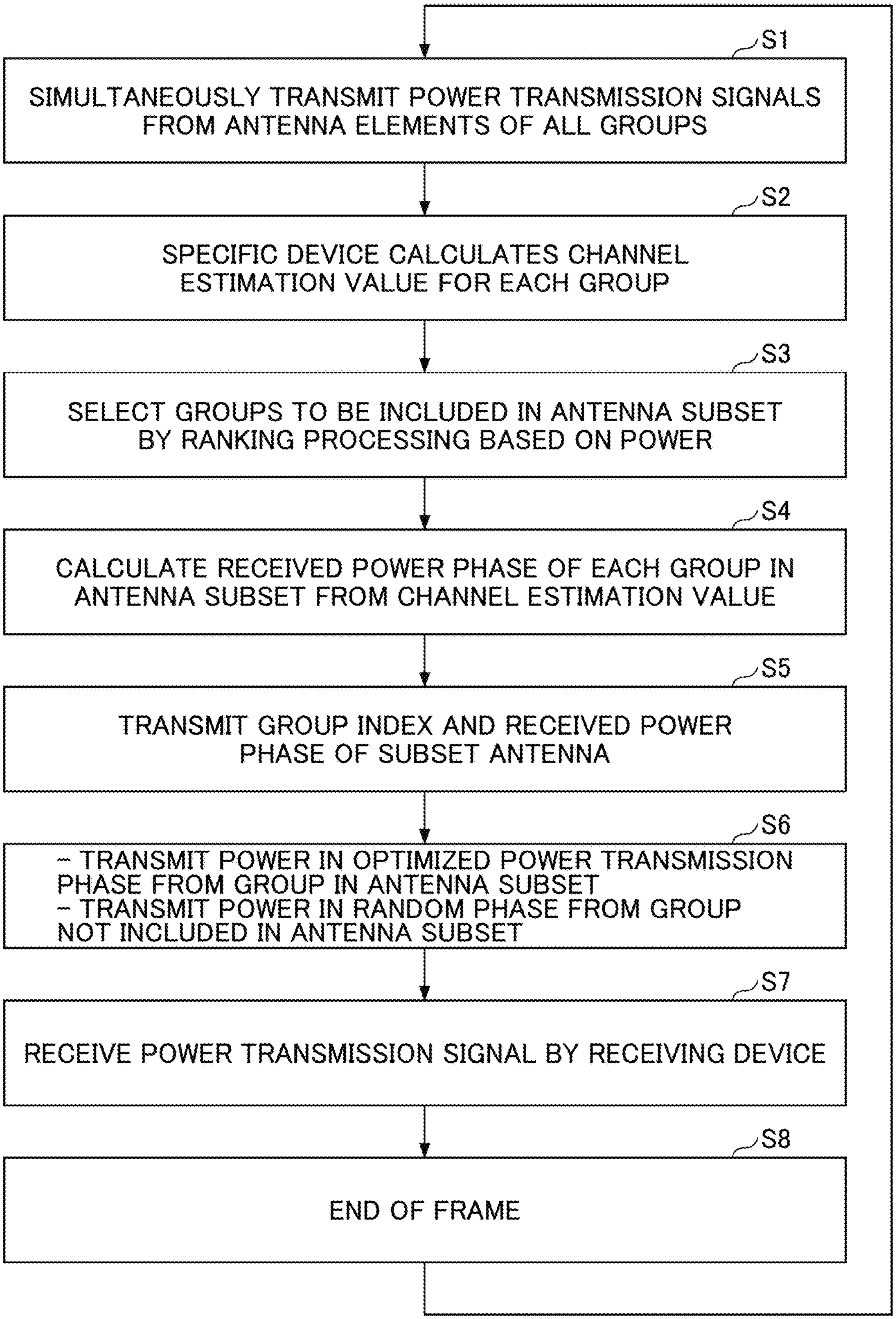
FIG. 10 is a flowchart illustrating an example of processing executed by the control device 140 and the specific device 50A of the power supply system 300.

FIG. 10 is a flowchart illustrating an example of processing executed by the control device 140 and the specific device 50A of the power supply system 300. Although the control device 140 and the specific device 50A execute processing separately, here, they are described as a series of processing executed within the power supply system 300. The processing as illustrated in FIG. 10 is executed within one frame, and is executed in the same manner in each frame.

The power transmission controller 142 of the power supply device 100 simultaneously transmits power transmission signals from the antenna elements 111 of all groups (step S1). For example, power transmission is performed repeatedly over the time slots 1 to $N_S$ illustrated in FIG. 8.

The channel estimator 56 of the specific device 50A calculates a channel estimation value for each group (step S2).

The subset selector 57 of the specific device 50A calculates received power for each group based on the channel estimation value, executes ranking processing based on the received power of all groups, and selects groups to be included in the antenna subset 110A (step S3).

The received-power phase estimator 58 of the specific device 50A calculates the received power phase of each group included in the antenna subset 110A (step S4).

The received-power phase estimator 58 of the specific device 50A transmits the received power phase of each group and the selection result to the communicator 59 (step S5).

The power transmission controller 142 of the power supply device 100 transmits the power transmission signals from the antenna elements 111 of the group included in the antenna subset 110A by random beamforming while maintaining the optimized power transmission phase, and transmits the power transmission signals from the antenna elements 111 of the group not included in the antenna subset 110A by random beamforming (step S6). As a result, the antenna elements 111 of the group included in the antenna subset 110A transmit the power transmission signals by shifting the optimized power transmission phase by a predetermined phase for each time slot, and the antenna elements 111 of the group not included in the antenna subset 110A transmit the power transmission signals by random power transmission phase for each time slot.

The specific device 50A and the non-specific devices 50B receive the power transmission signal by the antenna 51 (step S7).

When the processing of step S7 ends, the frame ends (step S8). When the processing in one frame is completed in step S8, the processing flow returns to step S1.

<Simulation>

Figure 11:
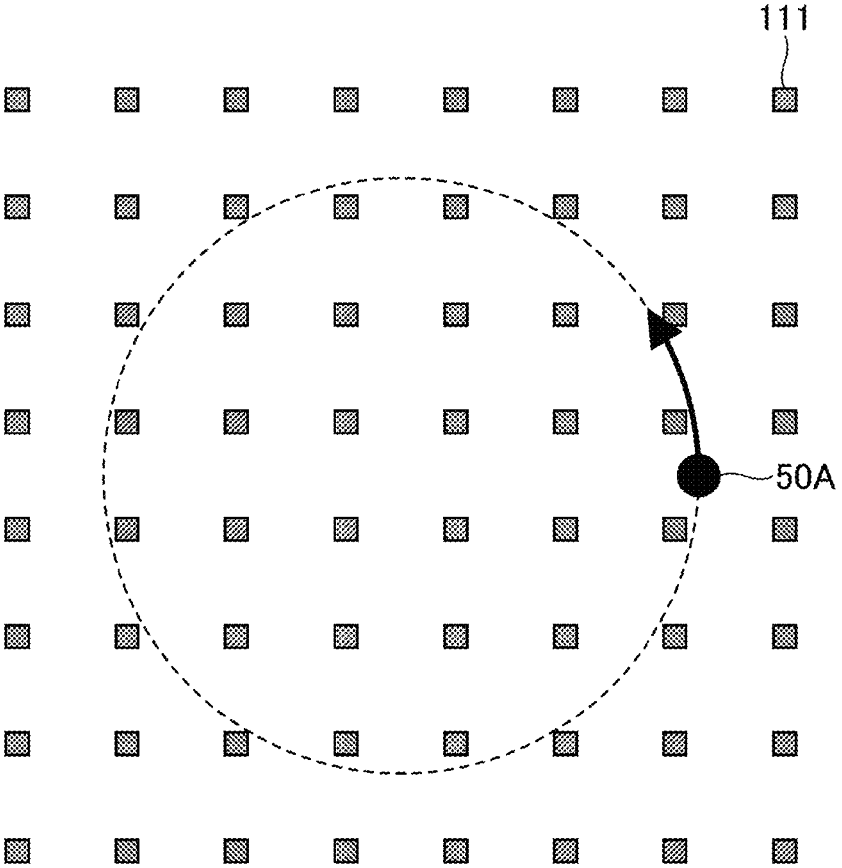
FIG. 11 is a diagram illustrating an example of simulation conditions.

FIG. 11 is a diagram illustrating an example of simulation conditions. As an example, a simulation was performed in which 64 antenna elements 111 in an 8×8 arrangement were arrayed in an array and power was supplied to a specific device 50A. The specific device 50A moved on a track of a dotted circle at a speed of 2.0 m/sec. The distance between the antenna elements 111 was 2 m, the height of the antenna elements 111 was 2.5 m, the time slot length was 0.5 ms (milliseconds), and the frame length was 50 ms.

In the simulation of the power supply system 300, ranking processing was executed for the received power of all groups for each frame, and a plurality of antenna elements 111 included in the antenna subset 110A were selected based on a ranking result. The plurality of antenna elements 111 included in the antenna subset 110A transmitted power transmission signals by random beamforming while maintaining an optimized power transmission phase relationship. The antenna elements 111 not included in the antenna subset 110A transmitted the power transmission signals by random beamforming. In this way, simulation on the amount of power received by the specific device 50A was performed.

In addition, for comparison, 1 to 64 different indices were assigned to all the antenna elements 111 without grouping the 64 antenna elements 111, 64 time slots were provided in the optimization period, and simulation on the amount of power received by the specific device 50A was performed in the case of transmission by random beamforming in the power supply period.

Figure 12A:
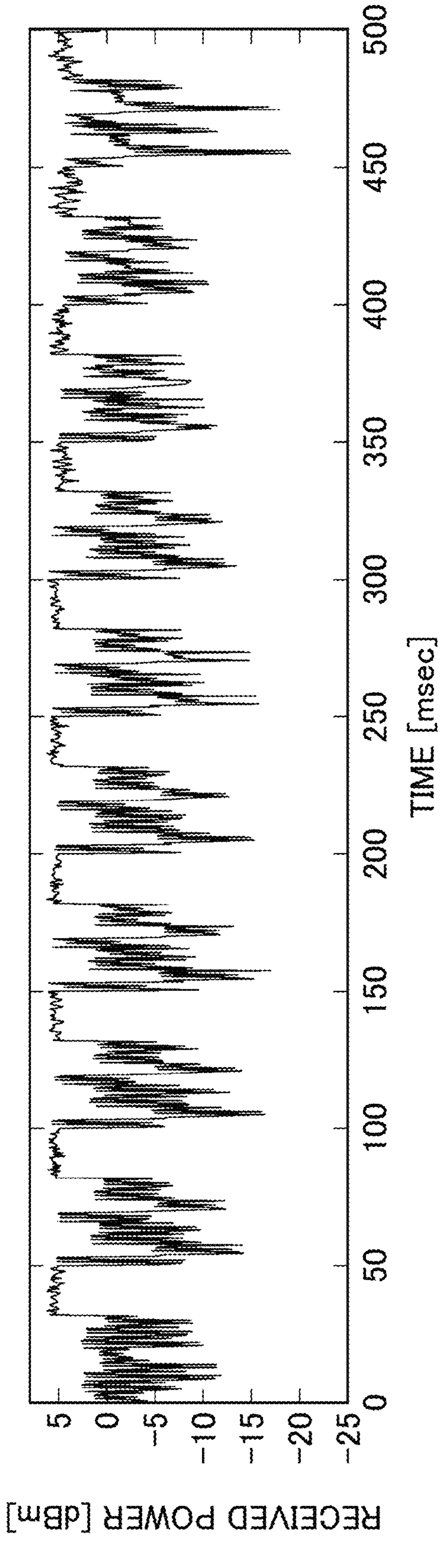
FIG. 12A is a diagram illustrating an example of a simulation result of received power when transmission is performed by random beamforming for comparison.

FIG. 12A is a diagram illustrating an example of the simulation result of the received power in the case of transmission by random beamforming for comparison. In FIG. 12A, a horizontal axis represents time, and a vertical axis represents received power (dBm). In the case of transmission by random beamforming for comparison, the received power in the period of approximately 30 ms in the first half of each 50 ms frame was approximately 0 dBm, which corresponds to the optimization period. The time slot length was 0.5 ms, and since there were 64 time slots, the optimization period required 32 ms. The period where the received power of approximately 5 dBm was obtained in the second half of each frame corresponds to the power supply period, but the power supply period was less than 20 ms. Accordingly, it was confirmed that the optimization period was longer than the power supply period.

Figure 12B:
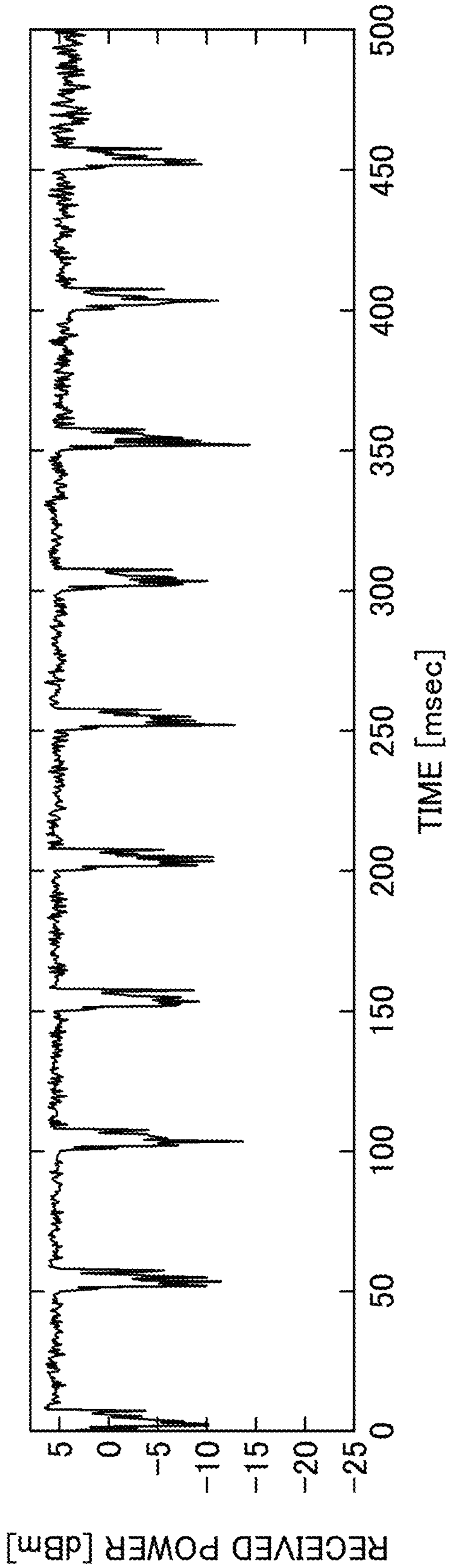
FIG. 12B is a diagram illustrating an example of a simulation result of the power supply system 300.

FIG. 12B is a diagram illustrating an example of a simulation result of the power supply system 300. In FIG. 12B, a horizontal axis represents time, and a vertical axis represents the received power (dBm).

As illustrated in FIG. 12B, the period in which the received power became approximately 0 dBm at the beginning of each frame period was approximately 6 ms, which corresponds to the optimization period. As compared with the random beamforming for comparison illustrated in FIG. 12A, the optimization period was reduced to approximately ¼, and the period in which the received power of approximately 5 dBm was obtained was approximately twice as long. Moreover, although one group includes four antenna elements 111, the received power is approximately equivalent to the received power in the power supply period of the random beamforming for comparison illustrated in FIG. 12A. Therefore, the power supply period can be extended, and it was confirmed that the power received by the specific device 50A per unit time can be increased.

<Advantageous Effect>

The power supply system 300 is a power supply system 300 including the power supply device 100 and the specific device 50A configured to receive power transmission signals transmitted from the power supply device 100, wherein the power supply device 100 includes the array antenna 110 provided with the plurality of antenna elements 111 configured to transmit power, and the power transmission controller 142 configured to control the phase of the power transmission signals transmitted from the plurality of antenna elements 111 to the specific device 50A and to perform power transmission control; the plurality of antenna elements 111 are divided into a plurality of groups, each group including a plurality of antenna elements 111; and the antenna elements 111 included in N ("N" is an integer of 2 or greater) groups among the plurality of groups are included in the antenna subset 110A configured to transmit the power transmission signals to the specific device 50A; and the specific device 50A selects, as the groups to be included in the antenna subset 110A, the top N groups supplying the largest power by the power transmission signals to the specific device 50A. As described above, since the plurality of antenna elements 111 are divided into a plurality of groups and the top N groups supplying the largest power by the power transmission signal the specific device 50A are selected as the groups to be included in the antenna subset 110A, a phase capable of increasing the power received by the specific device 50A can be quickly set.

Therefore, a power supply system 300 capable of quickly setting a phase capable of increasing the power received by the specific device 50A is provided.

Furthermore, the power transmission controller 142 is configured to transmit the power transmission signal from the plurality of antenna elements 111 while shifting the phase of the power transmission signal over a plurality of time slots based on a code table in which the code values are randomly set over the plurality of time slots for each group; and the specific device 50A is configured to determine the received power when the specific device 50A receives the power transmission signals transmitted from the plurality of antenna elements 111 over the plurality of time slots for each group, and to select the top N groups supplying the largest power as the groups to be included in the antenna subset 110A. Thus, since the power transmission phase can be set randomly for each group based on the code table, and since the top N groups supplying the largest power are selected as the groups to be included in the antenna subset 110A, the power transmission phase for each group can be readily set, and the groups capable of supplying more power to the specific device 50A can be readily selected.

Furthermore, the specific device 50A determines the channel estimation value for each group based on the demodulation information obtained by demodulating the received power transmission signals and the code values over a plurality of time slots included in the code table, determines the received power phase when the specific device 50A receives the power transmission signals from each of the N groups based on the N channel estimation values of the N groups, and notifies the power transmission controller 142 of the received power phases for the N groups; and the power transmission controller 142 controls the power transmission phase of each group based on the received power phases for the N groups notified from the specific device 50A such that the received power phases when the specific device 50A receives the power transmission signals from the N groups are made to be the same. Based on the channel estimation values, the received power phases when the specific device 50A receives the power transmission signal from each group can be readily obtained, and the power transmission controller 142 can readily control the power transmission phase of each group based on the notified received power phases such that the received power phases of the specific device 50A are made to be the same.

The power transmission controller 142 determines the initial values of the power transmission phases of the N groups based on the received power phases for the N groups notified from the specific device 50A, and adds a common random phase shift amount to the initial values of the N groups for each time slot, thereby controlling the power transmission phase of each group such that the received power phases when the specific device 50A receives the power transmission signals from the N groups are made to be the same. Therefore, the N groups can readily achieve random beamforming while maintaining the relationship between the initial values of the N power transmission phases.

Furthermore, a non-specific device 50B for receiving a power transmission signal transmitted from a power supply device 100 is included, and the power transmission controller 142 randomly sets the power transmission phase of an antenna included in a group other than N groups among the plurality of groups for each time slot. Therefore, as to the non-specific device 50B, power can be transmitted by random beamforming from the antenna element 111 of a group not included in the antenna subset 110A.

The position of the non-specific device 50B is fixed. Therefore, the power transmission signal by random beamforming can be efficiently and evenly received from the antenna element 111 of a group not included in the antenna subset 110A.

The specific device 50A is movable. Therefore, by setting the initial values of the N power transmission phases for the N groups for each frame following the movement, it is possible to efficiently supply power to the moving specific device 50A by random beamforming in which the relationship between the initial values of the N power transmission phases is maintained in each frame.

The power supply method in the power supply system 300 including the power supply device 100 and the specific device 50A configured to receive a power transmission signal transmitted from the power supply device 100, wherein the power supply device 100 includes the array antenna 110 including the plurality of antenna elements 111 configured to transmit power, and the power transmission controller 142 configured to control the phase of the power transmission signals transmitted from the plurality of antenna elements 111 to the specific device 50A and to perform power transmission control, wherein the plurality of antenna elements 111 are divided into a plurality of groups, each group includes a plurality of antenna elements 111, antennas included in N ("N" is an integer of 2 or greater) groups are included in the antenna subset 110A configured to transmit power transmission signals to the specific device 50A, and the specific device 50A selects, as groups to be included in the antenna subset 110A, the top N groups supplying the largest power by the power transmission signal to the specific device 50A. As described above, since the plurality of antenna elements 111 are divided into a plurality of groups and the top N groups supplying the largest power by the power transmission signal specific device 50A are selected as the groups to be included in the antenna subset 110A, a received power phase capable of increasing the power to be received by the specific device 50A can be quickly set.

Therefore, a power supply method capable of quickly setting a phase capable of increasing the power received by the specific device 50A is provided.

The power supply system of an exemplary embodiment of the present invention, the power supply system, and the power supply method have been described above, but the present invention is not limited to the disclosed embodiment and can be modified and changed in various ways without departing from the scope of the claims.

The present international application is based on and claims priority to Japanese Patent Application No. 2022-180987 filed on Nov. 11, 2022, the entire contents of which are incorporated herein by reference.

REFERENCE SIGNS LIST

10 Area
50 Device
50A Specific device
50B Non-specific device
51 Antenna
SW Switch
52 Controller
53 RF/DC converter
54 Battery
55 Quadrature detector
56 Channel estimator
57 Subset selector
58 Received-power phase estimator
59 Communicator
100 Power supply device
110 Array antenna
110A Antenna subset
111 Antenna element
120 Phase shifter
130 Microwave source
140 Control device
141 Main controller
142 Power transmission controller
143 Memory

The invention claimed is:

1. A power supply system, comprising:
a power supply device; and
a first power receiving device configured to receive a power transmission signal transmitted from the power supply device, wherein
the power supply device includes
an array antenna including a plurality of antennas configured to transmit power; and
a power transmission controller configured to control a phase of the power transmission signal transmitted from the plurality of antennas to the first power receiving device and to perform power transmission control,
the plurality of antennas are divided into a plurality of groups;
each group includes a plurality of antennas, each antenna being from among the plurality of antennas;
the antennas included in N ("N" is an integer of 2 or greater) groups among the plurality of groups are included in an antenna subset configured to transmit the power transmission signal to the first power receiving device; and the first power receiving device is configured to select top N groups supplying largest power by the power transmission signal to the first power receiving device, as the groups to be included in the antenna subset, the power transmission controller is configured to transmit the power transmission signal from the plurality of antennas while shifting the phase of the power transmission signal over a plurality of time slots based on a code table in which code values are randomly set over the plurality of time slots for each group, and the first power receiving device is configured to determine received power upon receiving the power transmission signal transmitted from the plurality of antennas over the plurality of time slots by the first power receiving device for each group, and to select the top N groups supplying the largest power as the groups to be included in the antenna subset.

2. The power supply system according to claim 1, wherein the first power receiving device determines a channel estimation value for each of the groups based on demodulation information obtained by demodulating the power transmission signal received and the code values over the plurality of time slots included in the code table, determines a received power phase upon receiving the power transmission signal from each of the N groups by the first power receiving device based on the N number of channel estimation values of the N groups, each being the channel estimation value, and notifies the power transmission controller of received power phases for the N groups, each of the received power phases being the received power phase, and the power transmission controller controls a power transmission phase of each group based on the received power phases for the N groups notified from the first power receiving device such that received power phases upon receiving power from the N groups by the first power receiving device are made to be the same.

3. The power supply system according to claim 2, wherein the power transmission controller determines initial values of power transmission phases of the N groups, each of the power transmission phases being the power transmission phase, based on the received power phases for the N groups notified from the first power receiving device, and adds a common random phase shift amount to the initial values of the N groups for each time slot, thereby controlling the power transmission phase of each group such that the received power phases upon receiving power from the N groups by the first power receiving device are made to be the same.

4. The power supply system according to claim 1, further comprising:

a second power receiving device configured to receive the power transmission signal transmitted from the power supply device, wherein the power transmission controller randomly sets the power transmission phase of an antenna included in a group other than the N groups among the plurality of groups for each time slot.

5. The power supply system according to claim 4, wherein a position of the second power receiving device is fixed.

6. The power supply system according to claim 1, wherein the first power receiving device is movable.

7. A power supply method in a power supply system including a power supply device and a first power receiving device configured to receive a power transmission signal transmitted from the power supply device, wherein the power supply device includes an array antenna including a plurality of antennas configured to transmit power; and a power transmission controller configured to control a phase of the power transmission signal transmitted from the plurality of antennas to the first power receiving device and to perform power transmission control, the plurality of antennas are divided into a plurality of groups;

each group includes a plurality of antennas, each antenna being from among the plurality of antennas; and the antennas included in N ("N" is an integer of 2 or greater) groups among the plurality of groups are included in an antenna subset configured to transmit the power transmission signal to the first power receiving device, and the power transmission controller is configured to transmit the power transmission signal from the plurality of antennas while shifting the phase of the power transmission signal over a plurality of time slots based on a code table in which code values are randomly set over the plurality of time slots for each group, the power supply method, comprising:

selecting, by the first power receiving device, top N groups supplying largest power by the power transmission signal to the first power receiving device, as the groups to be included in the antenna subset; and determining, by the first power receiving device, received power upon receiving the power transmission signal transmitted from the plurality of antennas over the plurality of time slots by the first power receiving device for each group, and selecting the top N groups supplying the largest power as the groups to be included in the antenna subset.

* * * * *